US012557735B2

(12) United States Patent
Fischer et al.

(10) Patent No.: US 12,557,735 B2
(45) Date of Patent: Feb. 24, 2026

(54) CORN HEADER FOR A FORAGE HARVESTER AND FORAGE HARVESTER WITH SUCH A CORN HEADER

(71) Applicant: CLAAS Saulgau GmbH, Bad Saulgau (DE)

(72) Inventors: Josef Fischer, Biberach (DE); Martin Link, Hochdorf (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 713 days.

(21) Appl. No.: 17/952,815

(22) Filed: Sep. 26, 2022

(65) Prior Publication Data

US 2023/0114778 A1 Apr. 13, 2023

(30) Foreign Application Priority Data

Sep. 28, 2021 (DE) .......................... 102021125044.7

(51) Int. Cl.
*A01D 43/08* (2006.01)

(52) U.S. Cl.
CPC .................................. *A01D 43/081* (2013.01)

(58) Field of Classification Search
CPC .............................. A01D 43/081; A01D 45/025
See application file for complete search history.

(56) References Cited

U.S. PATENT DOCUMENTS

| | | | | |
|---|---|---|---|---|
| 1,108,536 A | * | 8/1914 | Wodtli | A01D 34/23 |
| | | | | 56/316 |
| 2,097,921 A | * | 11/1937 | Hite | A01D 34/23 |
| | | | | 56/316 |

| | | | | |
|---|---|---|---|---|
| 2,521,999 A | * | 9/1950 | Scott | A01D 43/10 |
| | | | | 56/316 |
| 2,530,733 A | * | 11/1950 | Ronning | A01D 34/125 |
| | | | | 56/17.6 |
| 4,694,640 A | * | 9/1987 | Ermacora | A01D 34/23 |
| | | | | 56/13.6 |
| 5,237,804 A | * | 8/1993 | Bertling | A01D 43/082 |
| | | | | 56/60 |

(Continued)

FOREIGN PATENT DOCUMENTS

| | | | | |
|---|---|---|---|---|
| CA | 3046570 A1 | * | 12/2020 | A01D 41/14 |
| DE | 1946518 A1 | * | 3/1971 | A01D 33/06 |

(Continued)

OTHER PUBLICATIONS

Search Report from Germany; Jun. 23, 2022; 2 pages.

*Primary Examiner* — Arpad Fabian-Kovacs

(57) ABSTRACT

Corn header (4) for a forage harvester (1) having a plurality of mowing and infeed units (5), having a plurality of drum-like or chain-like mowing and infeed members (6), which are rotatable about a vertical axis and are drivable in a revolving manner, for severing the crop in a substantially horizontal direction, wherein the mowing and infeed members (6) arranged in the center between two sides (4a, 4b) of the corn header (4) are drivable in a revolving manner to convey crop out of a gap (12), forwards away from an infeed (9) of the forage harvester (1), wherein a central separating member (13) for separating the crop is positioned in a substantially vertical direction in the region of the gap (12) between the mowing and infeed members (6) arranged in the center of the corn header (4).

14 Claims, 3 Drawing Sheets

(56)                    References Cited

U.S. PATENT DOCUMENTS

| | | | | |
|---|---|---|---|---|
| 5,867,972 | A  * | 2/1999 | Laumann | A01D 41/14 56/126 |
| 6,457,302 | B1 * | 10/2002 | McCrea | A01D 63/04 56/316 |
| 9,775,292 | B2 * | 10/2017 | Horning | A01D 45/021 |
| 11,129,328 | B2 | 9/2021 | Remillard et al. | |
| 2013/0263566 | A1 * | 10/2013 | Lovett | A01D 34/23 56/316 |
| 2014/0250850 | A1 * | 9/2014 | Boenig | A01D 34/23 56/94 |
| 2015/0156965 | A1 * | 6/2015 | Bertino | A01D 34/40 56/192 |

FOREIGN PATENT DOCUMENTS

| | | | | |
|---|---|---|---|---|
| DE | 102013003970 | | 12/2015 | |
| EP | 3603379 | A1 * | 2/2020 | A01D 63/02 |
| WO | WO-03049532 | A1 * | 6/2003 | A01D 41/148 |

* cited by examiner

CORN HEADER FOR A FORAGE HARVESTER AND FORAGE HARVESTER WITH SUCH A CORN HEADER

The invention relates to a corn header for a forage harvester according to the preamble of claim 1. Furthermore, the invention relates to a forage harvester with such a corn header.

In the case of harvesters, a differentiation is basically made between harvesters in which the crop is threshed and between harvesters in which the crop is chopped.

Whenever a type of cereal, such as wheat, barley or oats or rapeseed as a crop is intended to be harvested, use is typically made of harvesters which are in the form of combine harvesters. By contrast, if corn, miscanthus or sorghum is intended to be harvested as the crop, use is typically made of forage harvesters as the harvesters.

A harvester which is in the form of a combine harvester and in which a crop which is to be harvested is threshed has an attachment with a plurality of mowing members which harvest the crop by forming a scissors-like separating cut. By contrast, a harvester in the form of a forage harvester has an attachment which is in the form of a corn header and has a plurality of mowing members driven in a revolving manner. The present invention here relates to a corn header of a harvester which is in the form of a forage harvester and in which the crop to be harvested is chopped and accordingly is not threshed.

DE 10 2004 022 534 A1 discloses a harvester which is in the form of a field chopper for harvesting stalk crops, such as corn or the like. The harvester has a corn header, wherein the corn header has a plurality of drum-like mowing and infeed members, which are driven in a revolving manner and are rotatable substantially about a vertical axis of rotation, for separating the crop in a substantially horizontal direction.

The corn header known from DE 10 2004 022 534 A1 is suitable without any restriction for harvesting corn. In principle, this corn header is also suitable for harvesting other crops, for example sorghum or miscanthus.

However, when harvesting crop using such a corner header, problems may arise whenever the crop to be harvested is not standing separately and vertically in the stand to be harvested, but rather the crop to be harvested is intertwined and/or lies horizontally.

DE 10 2013 003 970 B4 discloses a corn header of a forage harvester, in which a lateral separating member for separating the crop is positioned in a substantially vertical direction laterally next to the mowing and infeed members on at least one side of the corn header. By this means, the crop to be harvested can be actively severed at the sides of the corn header. An active separation of the crop is substantially carried out by this means in order to separate that part of the crop which lies within the working width of the corn header and is harvested in a current passage over it from the crop which lies outside the working width and is harvested only in a subsequent passage over it.

There is a need to be able to harvest crop more efficiently within a corn header.

Proceeding therefrom, the present invention is based on the object of providing a novel corn header for a forage harvester and a forage harvester with such a corn header.

This object is achieved by a corn header for a forage harvester according to claim 1.

In the case of the corn header according to the invention, a central separating member for separating the crop is positioned in a substantially vertical direction in the region of the gap between the mowing and infeed members of the pair of mowing and infeed units arranged in the center of the corn header The crop can likewise be actively severed via the central separating member which is positioned in the center of the corn header and which serves for separating the crop in a substantially vertical direction, although the central separating member is not used to separate the crop within the working width of the corn header from the crop outside the working width of the corn header, but rather to separate the crop which lies exclusively within the working width of the corn header and is harvested in a current passage over it. Frictionless transporting away of the harvested crop in the center of the corn header is thereby assisted. In particular, it is possible to separate the crop which is located within the working width in the region of the pair of mowing and infeed members arranged in the center of the corn header and to effectively remove the parts arising in the process, namely in the direction of an infeed positioned behind the mowing and infeed members.

The central separating member preferably protrudes in particular substantially vertically upwards in relation to a separating plane of the mowing and infeed members. Interwoven crop and also horizontally lying crop can thereby be particularly effectively separated, and the lateral conveying away in the corn header is advantageously facilitated.

The central separating member is preferably attached as far forwards as possible to the corn header, i.e. is positioned as far away as possible from the mowing and infeed members of the corn header, as seen in the harvesting direction. By this means, the crop is separated before it enters the region of the mowing and infeed members. This is particularly preferred for an advantageous further transport or transport away of the crop. The central separating member can be attached in particular to a central tip of the corn header and/or to a stem divider of the corn header.

The forage harvester according to the invention is defined in claim 12.

Preferred developments of the invention emerge from the dependent claims and the description below. Exemplary embodiments of the invention, without being limited thereto, will be explained in more detail with reference to the drawing, in which:

FIGS. 1 and 2 show a forage harvester according to the invention with a corn header according to the invention.

Figure 1:
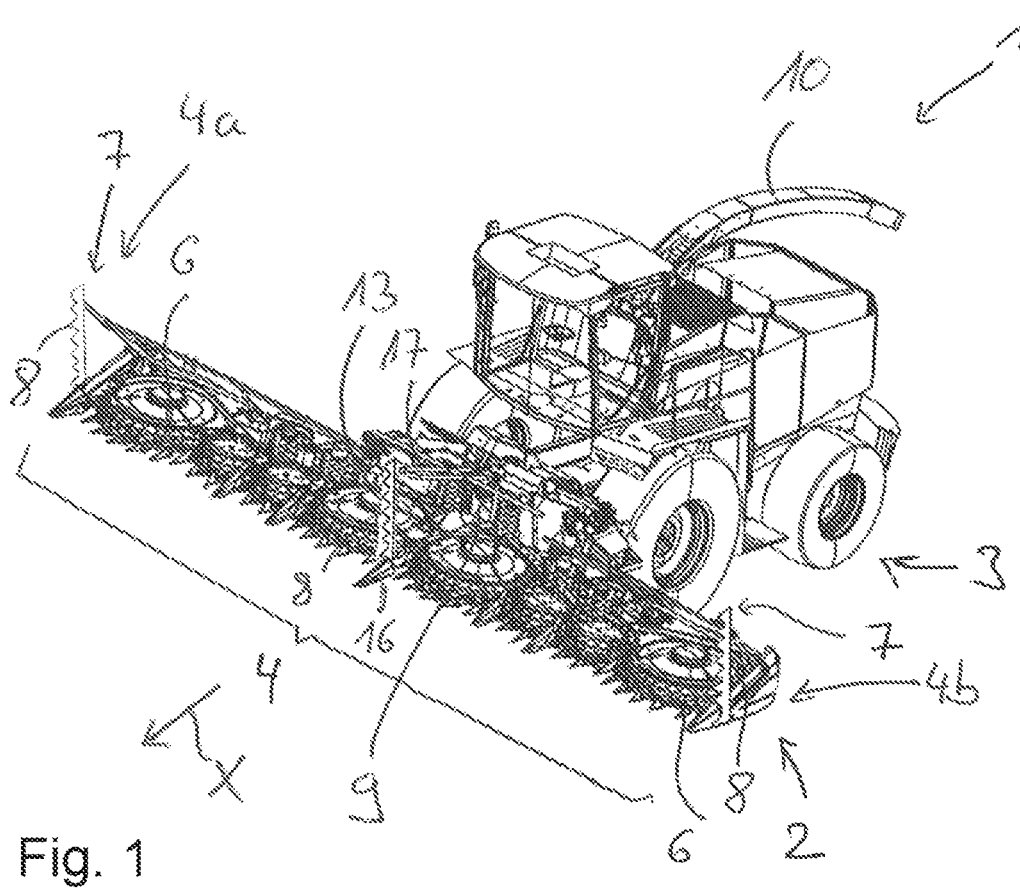
FIG. 1 shows a perspective view of a forage harvester with a corn header according to the invention.
Figure 2:
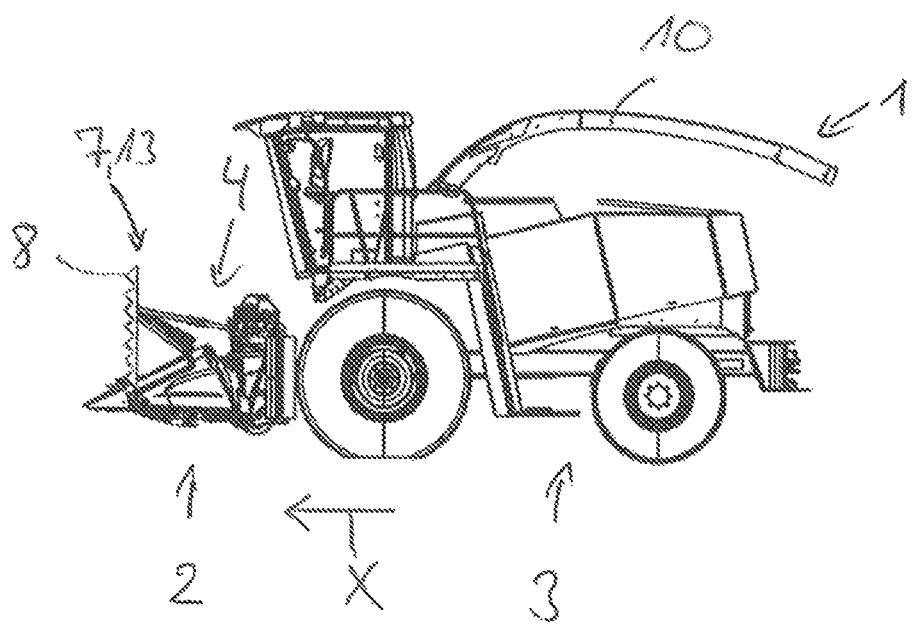
FIG. 2 shows a lateral view of the forage harvester of FIG. 1.

The forage harvester 1 comprises an attachment 2 which is coupled to carrier vehicle 3 and is moved along by the carrier vehicle 3 for harvesting work. FIGS. 1 and 2 clarify the direction of movement of the forage harvester 1 for harvesting work and therefore the harvesting direction by the arrow X.

The attachment 2 is a corn header 4 for harvesting stalk crops, for example maize, miscanthus or sorghum.

In the exemplary embodiment shown, the corn header 4 has a plurality of mowing and infeed units 5, wherein each mowing and infeed unit 5 has a plurality of drum-like mowing and infeed members 6 which are rotatable about a vertical axis and are driven in revolving manner.

The basic design of such a forage harvester is known, for example from DE 10 2004 022 534 A1. It should be pointed out at this juncture that the mowing and infeed members 6, which are driven in a revolving manner and belong to the mowing and infeed units of the corn header 4, may also be in the form of chain-like mowing and infeed members 6. The mowing and infeed members 6 which are driven in a revolving manner and belong to the corn header 4 serve for separating the crop in a substantially horizontal direction.

Furthermore, the mowing and infeed members 6 are provided with conveying elements for conveying the crop in the direction of an infeed 9 of the forage harvester 1. The infeed 9 of the forage harvester 1 is arranged behind the corn header 4, as seen in the harvesting direction X.

The infeed 9 supplies the crop to a chopping device, not shown in detail, of the forage harvester 1, in which the crop is chopped and cut into small pieces. The chopped material produced in this way can be discharged via a chute 10 of the forage harvester 1 onto a transport wagon, not shown, and therefore transported away.

Figure 3:
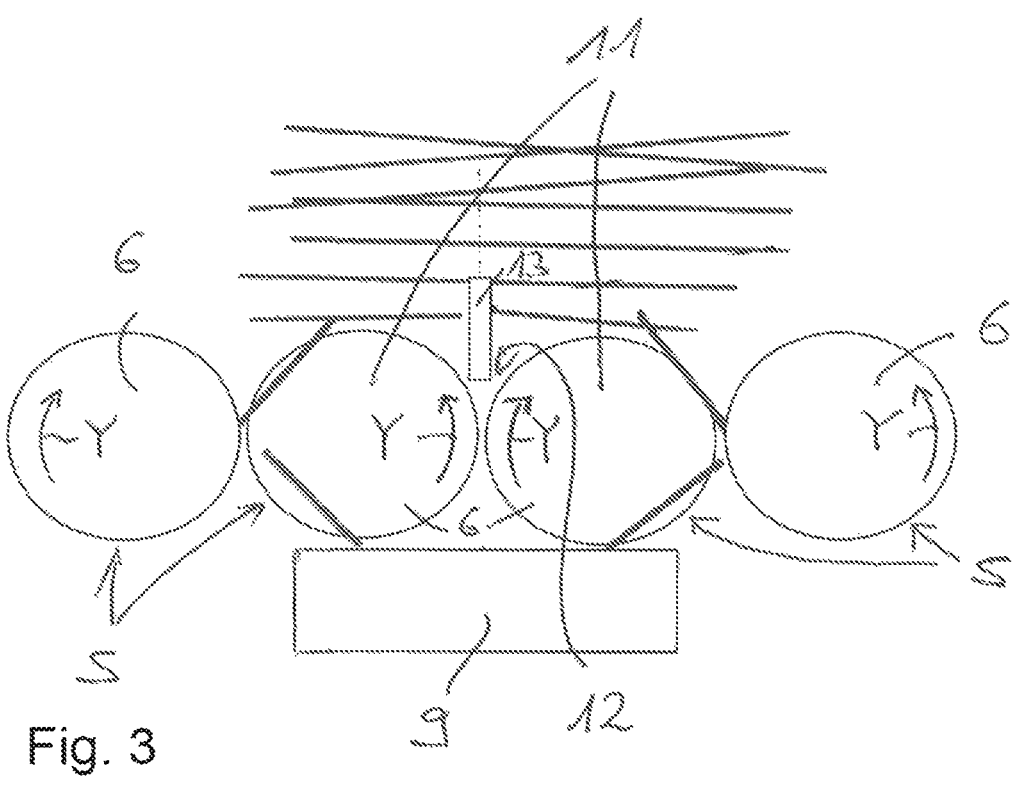
FIG. 3 shows a schematized detail of a corn header according to the invention in a top view together with an infeed of the forage harvester.

FIG. 3 shows a highly schematized cutout of a forage harvester 1 in the region of mowing and infeed units 5 and mowing and infeed members 6 of the corn header 4 and in the region of the infeed 9 positioned behind the corn header 4. Mowing and infeed units 5 arranged in the center of the corn header 4, namely in the center between two sides 4a, 4b of the corn header 4, form a pair 11 of mowing and infeed units 5, the mowing and infeed members 6 of which are drivable in a revolving manner such that they have a tendency to convey crop out of a gap 12, which is formed between them, forwards away from the infeed 9.

In FIG. 3, arrows Y clarify the direction of rotation of the respective mowing and infeed members 6 of the mowing and infeed units 5, wherein it can be gathered from the directions of rotation Y of the mowing and infeed members 6 of the pair 11 of mowing and infeed units 5 positioned in the center between the sides 4a, 4b that they rotate in different or contrary directions of rotation such that the crop is not conveyed into the gap 12, but rather is conveyed away laterally outwards.

In the case of the corn header 4 according to the invention, a central separating member 13 which serves for separating the crop in a substantially vertical direction is arranged in the region of the gap 12 between the mowing and infeed members 6 of the pair 11 of mowing and infeed units 5 arranged in the center of the corn header 4.

Said central separating member 13 protrudes upwards, preferably substantially vertically, in relation to a separating plane, which extends in the horizontal direction, of the mowing and infeed member 6 of the mowing and infeed units 5 of the corn header 4.

The central separating member 13 is preferably arranged as far forwards as possible on the corn header 4, i.e. as far away as possible from the mowing and infeed members 6 of the mowing and infeed units 5, as seen in the harvesting direction X. Crop can therefore already be separated by the central separating member 13 before the crop enters the region of the mowing and infeed members 6. Corresponding subsections of the crop can then be transported in orderly fashion by the mowing and infeed units 6 first of all outwards and subsequently rearwards in the direction of the infeed 9.

In the case of the preferred exemplary embodiment shown in FIG. 1, a respective separating member 7 for separating the crop is positioned in a substantially vertical direction on both sides 4a, 4b of the corn header 4, wherein said lateral separating members 7 also protrude upwards, preferably substantially vertically, in relation to the separating plane, which extends in the horizontal direction, of the mowing and infeed member 6.

The mowing and infeed members 6 of the mowing and infeed units 5 of the corn header 4 are drum-like or chain-like rotatable mowing and infeed members 6, which are driven in a revolving manner about a vertical axis, for separating the crop in the substantially horizontal separating direction or separating plane.

In the exemplary embodiment shown in FIGS. 1 and 2, the central separating member 13 and the lateral separating members 7 are separating members 7, 13 which have a plurality of separating knives 8 which are movable substantially linearly with respect to one another forming a scissors-like separating cut on the crop to be harvested and serve for separating the crop in a substantially vertical separating direction.

Figure 4:
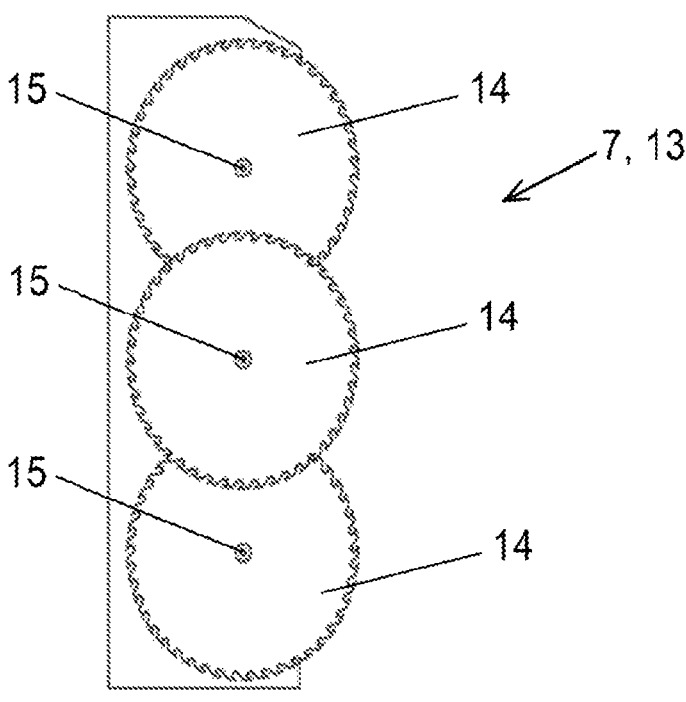
FIG. 4 shows an alternative separating member of a corn header according to the invention.

FIG. 4 shows an alternative configuration of a central separating member 13 or a lateral separating member 7 which has separating blades 14 which are designed in the manner of circular saw blades. Each of said separating blades 14 is rotatable about a horizontal axis of rotation 15, wherein, according to FIG. 4, the central separating blade 14 shown there is offset in the direction of its axis of rotation 15 in relation to the two other separating blades 14 such that the separating blades 14 can overlap. Such a separating member 7, 13 can also effectively separate the crop. The design of the separating members 7, 13 according to FIG. 4 is preferred whenever particularly resistant crop is intended to be harvested.

The central separating member 13 and lateral separating members 7 can be driven, for example hydraulically or electrically, by drive motor 20 independently of the mowing and infeed members 6 of the corn header 4. Alternatively, it is also possible for the separating members 7, 13 to be driven together with the mowing and infeed members 6.

With the invention, it is possible to avoid crop building in the center between the two sides 4a, 4b of a corn header 4. The crop located there is cut or separated with the aid of the central separating member 13, wherein subsections of the crop can then be transported away in orderly fashion via the mowing and infeed member 6 of the pair 11 of mowing and infeed units 5 positioned in the center of the corn header 4, namely first of all laterally outwards and then rearwards in the direction of the infeed 9 of the forage harvester 1. Functional problems due to building up crop can thus be avoided.

The central separating member 13 can be supported in particular at the bottom instead of what is referred to a row sensor on a central tip 16 of the corn header 4 and/or at the top on a stem divider 17, or can be fastened to said elements.

Figure 5:
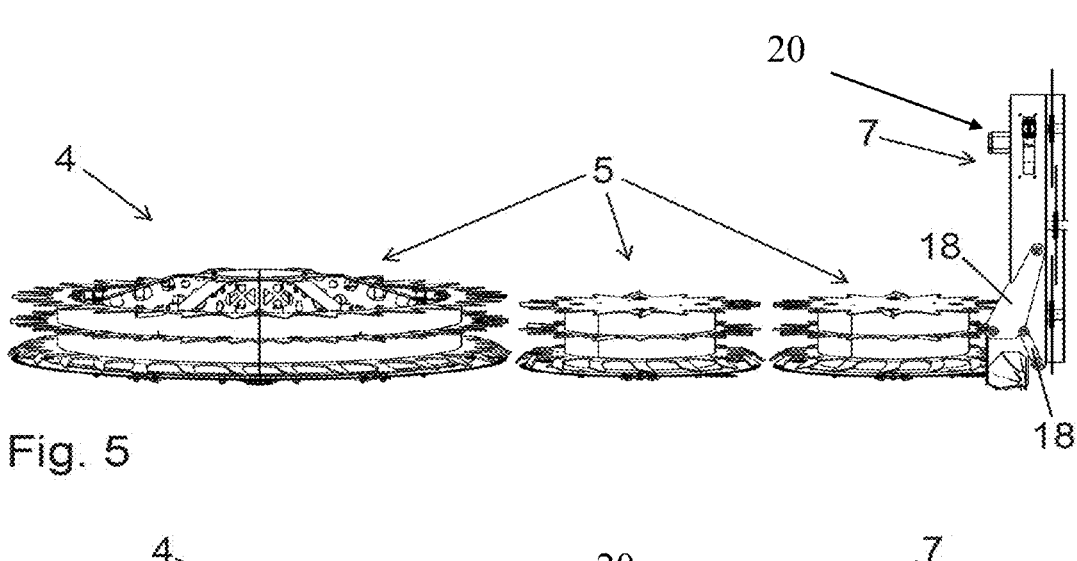
FIG. 5 shows a further exemplary embodiment with a lateral separating member.
Figure 6:
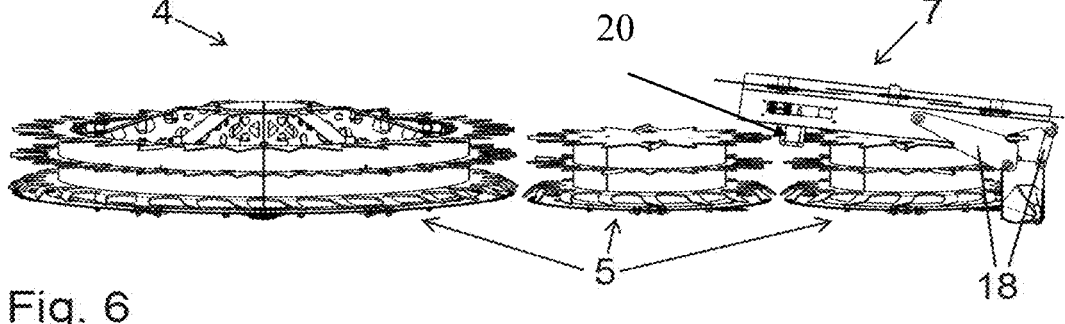
FIG. 6 shows the further exemplary embodiment of FIG. 5 in a different position.
Figure 7:
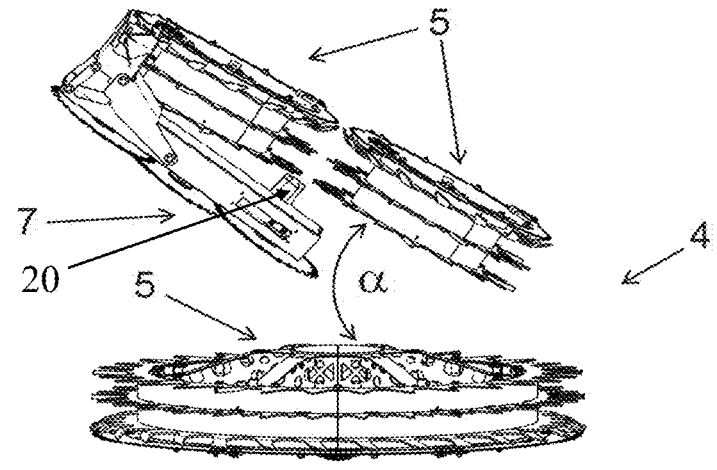
FIG. 7 shows the further exemplary embodiment of FIG. 5 in a transport position.

The highly schematized figures, FIG. 5-7, show a further exemplary embodiment, in which the lateral separating members 7 are fastened rotatably or pivotably to the corn header 4 preferably via linkages 18 in the form of a 4-bar linkage. In the illustration of FIG. 5 from the front of the corn header 4, as seen counter to the harvesting direction X, only the front links 18 can be seen. The lateral separating member 7 is in its working position in which it is oriented substantially vertically.

In the illustrations of FIGS. 5 to 7, only half of the corn header 4 is shown since the arrangement of the separating member 7 on the side, not illustrated, corresponds in mirror-inverted form to the side which is illustrated.

It is illustrated in FIG. 6 how the separating member 7 is folded or pivoted inwards into a substantially horizontal transport position. The separating plane of the separating member 7 is oriented approximately parallel to the upper sides of the mowing and infeed units 5 in order to be able to move the corn header 4 into a compact transport position.

The transport position of the exemplary corn header 4 with a lateral separating member 7 is illustrated in FIG. 7. It can be seen that the two outer mowing and infeed units 5 have been pivoted about an axis, which runs approximately in the harvesting direction X, over an inner mowing and infeed unit 5, as a result of which the width of the corn header 4 is reduced. In the exemplary embodiment illustrated, the outer mowing and infeed units 5 enclose an acute angle α of approximately 25-45 angular degrees with the inner mowing and infeed unit 5. Depending on the working width and design of a corn header 4, it may be necessary to reduce the angle α. In some cases, it may also suffice to fold the outer mowing and infeed units 5 only approximately as far as the vertical.

As an alternative to the described four-bar linkage, the linkage having three links or else a simple rotational linkage can also be provided for the rotatable or pivotable fastening of the separating member 7 to the corn header 4.

The separating member 7 can be pivoted or moved manually or by means of actuators.

Lateral separating members 7 can be provided on both sides 4a and 4b or else only on one side 4a or 4b.

LIST OF REFERENCE SIGNS

1 Forage harvester
2 Attachment
3 Carrier vehicle
4 Corn header
4a Side
4b Side
5 Mowing and infeed unit
6 Mowing and infeed member
7 Separating member
8 Separating knife
9 Infeed
10 Discharge chute
11 Pair
12 Gap
13 Separating member
14 Separating blade
15 Axis of rotation
16 Central tip
17 Stem divider
18 Linkage

The invention claimed is:

1. A corn header (4) for a forage harvester (1) for harvesting stalk crops,
having a plurality of mowing and infeed units (5), which each have a plurality of drum-like or chain-like mowing and infeed members (6), which are rotatable about a vertical axis and are drivable in a revolving manner, for severing the crop in a substantially horizontal direction from a field to be cultivated,
wherein the mowing and infeed members (6) of a pair (11) of mowing and infeed units (5) arranged in the center between two sides (4a, 4b) of the corn header (4) are drivable in a revolving manner such that they have a tendency to convey crop out of a gap (12), which is formed between them, forwards away from an infeed (9) of the forage harvester (1),
characterized in that
a central separating member (13) for separating the crop is positioned in a substantially vertical direction in the region of the gap (12) between the mowing and infeed members (6) of the pair (11) of mowing and infeed units (5) arranged in the center of the corn header (4) and wherein the central separating member (13) is attached to a forward portion of the corn header.

2. The corn header-according to claim 1, characterized in that the central separating member (13) protrudes in particular substantially vertically upwards in relation to a separating plane of the mowing and infeed members (6).

3. The corn header according to claim 1, characterized in that the central separating member (13) has separating knives (8) which are movable substantially linearly with respect to one another forming a scissors-like separating cut.

4. The corn header according to claim 1, characterized in that the central separating member (13) has separating blades (14) which are rotatable about horizontal axes of rotation (15), are offset with respect to one another in the direction of their axes of rotation (15) and partially overlap.

5. The corn header according to claim 1, characterized in that a lateral separating member (7) for separating the crop is positioned in a substantially vertical direction laterally next to the mowing and infeed units (5) on at least one side (4a, 4b), in particular on each side (4a, 4b), of the corn header (4).

6. The corn header according to claim 5, characterized in that each of the lateral separating members (7) protrudes in particular substantially vertically upwards in relation to a separating plane of the mowing and infeed members (6).

7. The corn header according to claim 5, characterized in that each of the lateral separating members (7) has separating knives (8) which are movable substantially linearly with respect to one another forming a scissors-like separating cut.

8. The corn header according to claim 5, characterized in that each of the lateral separating members (7) has separating blades (14) which are rotatable about horizontal axes of rotation (15), are offset with respect to one another in the direction of their axes of rotation (15) and partially overlap.

9. The corn header according to claim 5, characterized in that each of the lateral separating members (7) is foldable or pivotable inwards into an approximately horizontal transport position.

10. The corn header according to claim 5, characterized in that each of the lateral separating members (7, 13) is drivable hydraulically or electrically independently of the mowing and infeed members (6).

11. The corn header according to claim 5, characterized in that each of the lateral separating members (7, 13) is drivable together with the mowing and infeed members (6).

12. A forage harvester (1), with an attachment (2) in the form of a corn header (4) for harvesting stalk crops, characterized in that the corn header (4) is designed according to claim 1.

13. The corn header according to claim 1, wherein the corn header is mounted in front of the forage harvester.

14. The corn header according to claim 1, wherein a bottom portion of the central separating member (13) is attached to a forward portion of the corn header.

\* \* \* \* \*